United States Patent
Genoud et al.

(10) Patent No.: US 7,429,705 B2
(45) Date of Patent: Sep. 30, 2008

(54) PARALLEL-GUIDING MECHANISM FOR COMPACT WEIGHING SYSTEM

(75) Inventors: Dominique Genoud, Uster (CH); Hans-Rudolf Burkhard, Wila (CH); Jean-Christophe Emery, Zürich (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/441,005

(22) Filed: May 26, 2006

(65) Prior Publication Data

US 2006/0266562 A1 Nov. 30, 2006

(30) Foreign Application Priority Data

May 26, 2005 (EP) ................... 05104522

(51) Int. Cl.
*G01G 9/00* (2006.01)
*G01G 21/00* (2006.01)

(52) U.S. Cl. ............... 177/210 EM; 177/212; 177/229; 73/862.634

(58) Field of Classification Search ................... 73/1.74, 73/862.634, 862.639; 177/201 EM, 212, 177/229, 1

See application file for complete search history.

(56) References Cited

U.S. PATENT DOCUMENTS

| | | | | |
|---|---|---|---|---|
| 2,969,228 A * | 1/1961 | Appius | ....................... | 177/229 |
| 3,135,112 A * | 6/1964 | Farley | .................... | 73/862.382 |
| 3,161,046 A * | 12/1964 | Farley | .................... | 73/862.622 |
| 3,590,933 A * | 7/1971 | Forman | ....................... | 177/229 |
| 4,433,742 A | 2/1984 | Lee | | |
| 4,467,883 A | 8/1984 | Meier | | |
| 4,497,386 A | 2/1985 | Meier | | |
| 4,585,083 A | 4/1986 | Nishiguchi | | |
| 4,838,371 A | 6/1989 | Rupprecht et al. | | |
| 4,848,493 A * | 7/1989 | Hitchcock | .................... | 177/211 |
| 5,183,125 A * | 2/1993 | Schurr | ........................ | 177/211 |
| 5,646,375 A * | 7/1997 | Neuman | ...................... | 177/54 |
| 5,880,410 A * | 3/1999 | Neuman | ...................... | 177/187 |
| 6,232,567 B1 * | 5/2001 | Bonino et al. | ........... | 177/210 EM |
| 6,615,638 B1 * | 9/2003 | Lochner et al. | ............... | 73/1.74 |
| 6,634,235 B2 * | 10/2003 | Maeda et al. | .................. | 73/781 |

(Continued)

FOREIGN PATENT DOCUMENTS

CH 593 481 12/1977

(Continued)

*Primary Examiner*—Randy W Gibson
(74) *Attorney, Agent, or Firm*—Buchana Ingersoll & Rooney PC

(57) ABSTRACT

An exemplary weighing module is disclosed which has a load receiver and a weighing cell that are connected to each other by a force-transmitting rod, wherein the weighing module is arranged inside a design space whose dimensions in a plane extending orthogonal to the load direction are limited by the design spaces occupied by neighboring weighing cells or represent the largest dimension of the weighing cell in said plane. An exemplary weighing cell has a parallel-guiding mechanism in which at least one movable parallel leg which is connected to the force-transmitting rod and at least one stationary parallel leg are arranged with a predefined guiding distance from each other, connected to each other by at least one upper parallel-guiding member and at least one lower parallel-guiding member. The effective length of the parallel-guiding members is larger than the guiding distance, and the movable parallel leg does not protrude out of the design space.

19 Claims, 7 Drawing Sheets

U.S. PATENT DOCUMENTS

| | | | |
|---|---|---|---|
| 7,250,577 B2 * | 7/2007 | Schilling et al. ............... | 177/1 |
| 7,339,122 B2 * | 3/2008 | Burkhard ....................... | 177/1 |
| 2006/0201719 A1 * | 9/2006 | Burkhard | |

FOREIGN PATENT DOCUMENTS

| | | | |
|---|---|---|---|
| CH | 654 412 A5 | | 2/1986 |
| DE | 299 17 940 U1 | * | 5/2000 |
| DE | 102 42 118 A1 | | 11/2003 |
| JP | 1-212327 | | 8/1989 |
| JP | 2006-329989 A | * | 5/2006 |

* cited by examiner

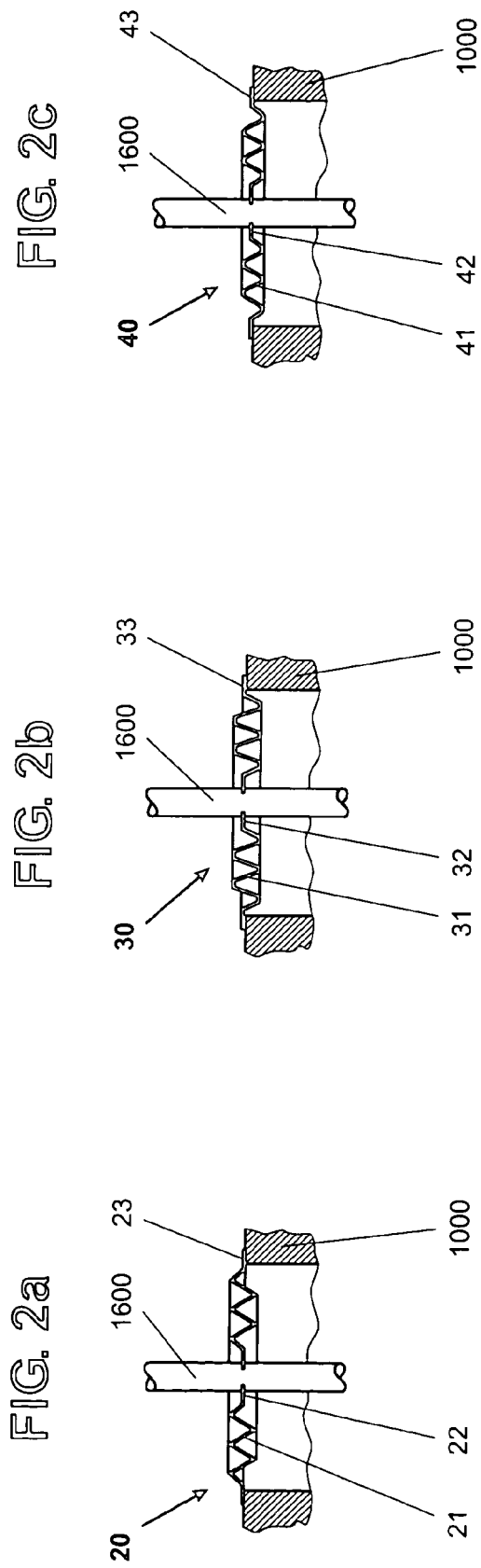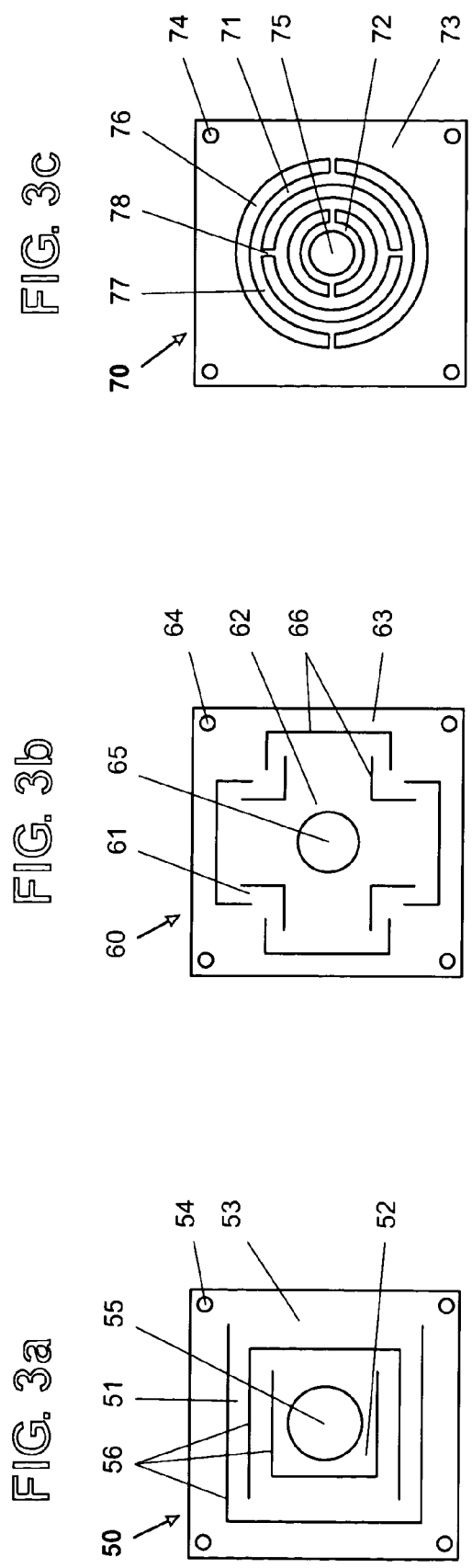

PARALLEL-GUIDING MECHANISM FOR COMPACT WEIGHING SYSTEM

RELATED APPLICATIONS

The present application claims priority under 35 U.S.C. §119 to European Application No. 05104522.7 filed May 26, 2005, the contents of which are hereby incorporated by reference in their entirety.

BACKGROUND

1. Field

A weighing module, and a device that is used to weigh substantially uniform weighing objects with a given number of weighing modules, are disclosed. Each module has a load receiver that is connected to a weighing cell through a force-transmitting rod. A parallel-guiding mechanism is associated with each force-transmitting rod to constrain the latter in a parallel-guided movement in the direction of the load.

Applications for a device designed to weigh substantially uniform weighing objects are found in automated production- and testing systems where balances of a modular configuration—so-called weighing modules—are particularly well suited to be integrally incorporated into these systems. In essence, the balances used for this purpose are of the type where the indicator unit is arranged separately from the balance, for example in a system with a central indicator unit for a plurality of weighing modules. Integrated weighing modules of this kind are used in systems for the production and testing of small and relatively expensive parts, for example in filling- and packaging machines for tablets, capsules, ampoules, etc. in the pharmaceutical industry, or in the checking of ball bearings. The weighing of substantially uniform objects and also the so-called batch-weighing are processes in which a plurality of load quantities have to be weighed individually, be it for the purpose of checking, dosage-dispensing, or filling, etc. within a limited space.

Since a conveyor device such as a robotic arm with multiple grippers can be used to put the weighing objects onto the individual load receivers of the weighing modules and to remove them from there after they have been weighed, the positions of the individual load receivers in relation to each other and in relation to the conveyor device have to be accurately and durably set.

2. Background Information

Devices which are used for weighing substantially uniform weighing objects are known. Predominantly, these devices are arrangements of weighing modules in rows or two-dimensional arrays. Other arrangements are based on the concept of placing the weighing modules in a two-dimensional satellite-like arrangement around a row arrangement of load carriers, wherein the latter have to be matched to the distances between the delivery elements of an existing conveyor device, because the weighing module is often too large to allow an arrangement at the required close intervals.

A two-dimensional arrangement of weighing cells is disclosed in JP 01212327 A, which describes a method of using a plate of a spring material to produce a large number of weighing cells carrying strain gauges as sensor elements. However, strain-gauge-based weighing cells—in contrast to weighing cells based on the principle of electromagnetic force compensation—may not suitable for applications involving the determination of a mass in the range of micrograms to grams.

A device for the gravimetric testing of multi-channel pipettes is disclosed in DE 299 17 940 U1. The device has a plurality of weighing cells arranged in a plane either in a satellite-like layout or side-by-side. To provide simultaneous weighing of the test volumes of a multi-channel pipette, the load receivers of the weighing cells are arranged close together. A satellite-like layout makes it possible to use relatively large weighing cells for the testing of multi-channel pipettes.

A weighing cell based on the principle of a single string oscillator is disclosed in CH 654 412 A5. Using two spring elements of a meandering shape, the load receiver is guided in parallel motion relative to the console. A factor of significant influence on the measurement accuracy of these weighing cells is that the force being measured is always applied in the same direction to the string. With the meander-like arrangement of the guide arms, the changes in length of the guide arms compensate each other so that the position of the load receiver relative to the console does not change with temperature variations.

In a weighing cell that functions according to the principle of electromagnetic force compensation, the force that is caused by a load on the weighing pan can be compensated by a force-compensating member having a permanent magnet and a coil, wherein the current is measured which flows through the coil to generate the compensating force. The measured value is in proportion to the load placed on the weighing pan. However, the measured value is also dependent on the position of the coil in the magnetic field of the permanent magnet and therefore, when determining the measurement value, the coil has to have the same position in relation to the magnet. The position of the coil after applying the load is determined by way of a position sensor, and the current through the coil is increased until the load-related displacement of the coil in relation to the permanent magnet is compensated. At this point the coil current is measured, which represents a measure for the weight of the applied load. A weighing cell of this type is disclosed in CH 638 894 A5, wherein the weighing cell has a force-transmitting device which is arranged between the load receiver and the force-compensating member and which transmits the force generated by the load on the load receiver to the force-compensating member, reducing or magnifying the force depending on the load range.

A weighing cell that works according to the same principle is disclosed in CH 593 481 A5. In this patent, the load receiver is coupled directly to the force-compensating member by way of a force-transmitting rod. The movable part of the position sensor is attached to the force-transmitting rod, while the stationary part of the position sensor is rigidly connected to the housing-based part of the weighing cell, or generally to the stationary part of the force-compensating member. This arrangement which is referred to as direct-measuring principle can be used in the range of small loads. As the position sensor has only a limited resolution, the precision of the measurement depends essentially on the resolution of the position sensor.

The load receiver and the coil of the force-compensating device are precisely guided in relation to the stationary part of the weighing cell. This can be accomplished by a parallel-guiding mechanism whose movable parallel leg is connected to the force-transmitting rod and whose stationary parallel leg is rigidly connected to the housing-based part of the weighing cell. The movable parallel leg and the stationary parallel leg are connected to each other through two parallel-guiding members that are rigid against bending and have thin flexure joints. However, one could also use spring-like elastic parallel-guiding members, in which case the thin flexure joints are omitted. When a load is placed on the load receiver, the force-transmitting rod moves in the direction of the load, whereby the parallel-guiding members are deflected and the thin flexure joints or spring-like elastic parallel-guiding members are caused to bend. Analogous to a leaf spring element, these thin flexure joints or spring-like elastic parallel-guiding members generate a moment of a magnitude that is in proportion to the angle of deflection of the parallel-guiding members and acts in the opposite direction of the bend, or a force that acts in the opposite direction of the load. The more massive the thin flexure joints are designed, the larger is the load differential that is needed to produce the minimally detectable displacement of the position sensor. Thus, the dimensions of the flexure joints or the elastically flexible parallel-guiding members can also significantly influence the resolution of the weighing cell.

The parallel-guiding mechanisms disclosed in the state-of-the-art references have a disadvantage that the maximally tolerable stress in the material being used imposes a limit on reducing the thickness of the thin flexure joints and that the parallel-guiding mechanism becomes very sensitive to overloads if the flexure joints or the elastic parallel-guiding members are made thinner. This can be alleviated by making the parallel-guiding members longer. This reduces the amount of angular movement at the flexure joints for the minimal displacement that can be detected by the position sensor. However, this can lead to unfavorable dimensions for weighing modules that are to be used in a device for weighing uniform weighing objects, so that the devices become expensive, voluminous and complicated.

SUMMARY

A weighing module is disclosed which, according to exemplary embodiments, can have small dimensions in a plane that is orthogonal to the direction of the load, without negative impact on resolution of the measured result due to the compact dimensions of the module.

An exemplary weighing module comprises a load receiver and a weighing cell that are connected to each other by a force-transmitting rod, wherein the weighing module is arranged within a design space whose dimensions—in a plane that runs orthogonal to the load direction—are limited by the design spaces occupied by neighboring weighing cells or represent the largest dimension of the weighing cell in said plane. An exemplary weighing cell comprises a parallel-guiding mechanism which has at least one movable parallel leg connected to the force-transmitting rod and at least one stationary parallel leg, wherein said parallel legs are arranged at a predefined guiding distance relative to each other and are connected to each other by at least one upper parallel-guiding member and at least one lower parallel-guiding member. As a means to reduce a displacing force on the movable parallel leg while the dimensions of the weighing module are kept small in the direction orthogonal to the load, the actual stretched-out length of the parallel-guiding members can be larger than the aforementioned guiding distance. The stretched-out length can be represented by the length of the bending-stress-neutral core fibers of the parallel-guiding members inclusive of the connecting areas to the parallel legs and, if applicable, inclusive of the thin flexure joints belonging to the parallel-guiding members. Furthermore, the movable parallel leg does not protrude out of the design space.

The term "guiding distance" refers to the direct distance between the movable parallel leg and the stationary parallel leg. According to exemplary embodiments, it is irrelevant how the parallel-guiding members connecting the two parallel legs are configured, and any suitable configuration can be used.

The actual stretched-out length of the parallel-guiding members or the length of the bending-stress-neutral core fibers of the parallel-guiding members inclusive of the connecting areas to the parallel legs and, if applicable, inclusive of the thin flexure joints belonging to the parallel-guiding members, will hereinafter be referred to as the effective length.

In order to simplify the manufacture of the weighing modules and to ensure that individual weighing modules in a device for weighing uniform objects will be easy to exchange, exemplary embodiments are configured wherein no parts of the parallel-guiding mechanism protrude beyond the weighing cell in any direction that is orthogonal to the load. In such an embodiment, the movable parallel leg can be arranged inside the design space of the respective weigh module. In another embodiment, the outside contour of the movable parallel leg or of the stationary parallel leg can correspond to the outside contour of the design space in a cross-sectional plane orthogonal to the load direction.

With a design of the parallel-guiding mechanism of the force-transmitting rod according to exemplary embodiments discussed herein, only a small elastic restoring force is generated by the flexure joints or by the elastic parallel-guiding members, and thus there is only a small deterioration of the resolution of the measurement value, while at the same time the dimensions of the mechanism are kept very small.

The parallel-guiding members can be configured with spring-like elasticity and can be rigidly connected to the stationary parallel leg and to the movable parallel leg. It is likewise possible to use comparatively rigid parallel-guiding members which are connected by way of thin flexure joints to the stationary parallel leg and to the movable parallel leg.

In one embodiment, the parallel-guiding mechanisms can be assembled from individual components, wherein the components such as the stationary parallel leg, the movable parallel leg, the thin flexure joints, and the parallel-guiding members are connected to each other by fastening means such as screws, rivets and the like.

The parallel-guiding mechanism according to a further embodiment can have an upper parallel-guiding member connected monolithically to an upper stationary parallel leg and an upper movable parallel leg. In like manner, the lower parallel-guiding member is connected monolithically to a lower stationary parallel leg and a lower movable parallel leg. The upper and lower stationary parallel legs are fixedly connected to the weighing cell housing either directly or through intermediate parts, while the upper and lower movable parallel legs are connected to each other by the force-transmitting rod.

The parallel-guiding mechanism can be arranged between the weighing cell and the load receiver and connected to the force-transmitting rod by the movable parallel leg.

In another exemplary arrangement the upper parallel-guiding member, which is arranged between the weighing cell and the load receiver, is connected by way of an upper movable parallel leg to the force-transmitting rod, while the lower parallel-guiding member, which is arranged on the side of the weighing cell that faces away from the load receiver, is connected by way of a lower movable parallel leg to a portion of the force-transmitting rod that extends beyond the weighing cell.

The parallel-guiding mechanisms can be made of a monolithic block or plate of material in which the material-free spaces are produced by drilling and milling, water-jet cutting, laser cutting, stamping, or also by means of spark erosion.

Parallel-guiding mechanisms that are produced in this manner can have diverse design configurations. The possibilities include parallel-guiding members that are folded meander-like in a plane that extends orthogonal to the load direction. If a parallel-guiding mechanism with such a meander-like configuration is elastically displaced in or against the load direction so that the movable parallel leg lies in a plane orthogonal to the load direction which has a parallel offset from the plane of the stationary parallel leg, the meander-like pattern of the parallel-guiding members can take the shape of a pyramid.

In a further embodiment of a parallel-guiding mechanism with a meander-like design of the parallel-guiding members, the parallel-guiding members can be folded in a plane that contains the load direction.

It is also possible to use concentrically profiled parallel-guiding diaphragms whose cross-sectional profiles are configured with a trapeze shape, a saw tooth shape, or a sinusoidal shape, or other desired shape.

Flat parallel-guiding diaphragms can be perforated by spiral-shaped or concentric cuts perpendicular to the diaphragm plane. Parallel-guiding diaphragms with concentric perforations have ring-shaped spring segments which for each perforation need to have at least one material connection from one segment to another or to the stationary parallel leg or the movable parallel leg. These material connections can be arranged at locations that are offset from each other in order to minimize the stiffness of the parallel-guiding diaphragm. If parallel-guiding diaphragms with spiral-shaped concentric perforations are elastically deflected in or against the load direction so that the movable parallel leg lies in a plane orthogonal to the load direction which has a parallel offset from the plane of the stationary parallel leg, the spiraling or concentric perforated pattern of the parallel-guiding members can take a cone shape.

With linear cuts perpendicular to the diaphragm plane, it is also possible to form a composite arrangement of leaf springs in the parallel-guiding diaphragm.

With all parallel-guiding mechanisms that have a meander-like configuration of the parallel-guiding members, or with all parallel-guiding mechanisms that have parallel-guiding diaphragms, particular attention needs to be given to the fact that in arrangements with a plurality of upper parallel-guiding members and a plurality of lower parallel-guiding members extending between the stationary parallel leg and the movable parallel leg, there needs to be symmetry between the parallel-guiding members so that the displacement of the movable parallel leg can only take place in or against the direction of the load and the movable parallel leg will not become tilted out of the load direction as a result of asymmetrically distributed forces acting between the individual upper and/or individual lower parallel-guiding members.

A synopsis of diaphragm springs may be found in "Konstruktionselemente der Feinmechanik" (Design Elements of Precision Mechanics) by W. Krause, $2^{nd}$ edition, published by Carl Hanser Verlag, Munich/Vienna 1993, keeping in mind that not all of the types of diaphragm springs listed on page 422 may be suitable for use in parallel-guiding mechanisms. Since parallel-guiding diaphragms can be very thin components, the perforations can be produced by means of spark erosion, stamping, water jet cutting, laser-cutting processes, photo-etching techniques and the like.

For achieving precise measuring results with an exemplary weighing cell, the form stability of the stationary parallel leg and its support and fixation on the weighing cell can be taken into consideration. An exemplary stationary parallel leg can have the same outside contour as the weighing cell housing. It can be advantageous if the stationary parallel leg is structured as a closed frame with the parallel-guiding members arranged at the inside of the frame. Furthermore, the bending stiffness of a very thin stationary parallel leg can be markedly increased by rolled or folded contour borders as well as by press-formed stiffening beads. The rolling of contour borders is a process where a thin sheet metal part is rolled in at the edge, a technique that is used for example in the production of sheet metal cans. Folding a contour border in the context of the present disclosure refers to a border portion that is folded to stand up at an angle from the surface plane of a sheet metal part, so that the resulting angle profile in the border area increases the bending stiffness of the sheet metal part. However, a comparable border area can also be produced for example by milling. The same can be said for producing projecting ribs instead of impressed beads. With the foregoing concepts, the stationary parallel leg can be supported over a large area, is not deformed by a load acting on the device, and the connecting elements that could cause internal stresses in the material can be arranged as far away as possible from the flexibly bending parallel-guiding members or from the thin flexure joints. The movable parallel leg can of course likewise be given an increased bending stiffness over all or part of its length by means of stiffening beads or ribs.

Several weighing modules can be rigidly connected to each other in a predefined spatial or two-dimensional arrangement to form a device for the weighing of substantially uniform weighing objects.

The individual weighing cells can be configured so that they can be connected to each other directly with a diversity of fastening means. But the weighing modules can also be rigidly connected to each other in an indirect way by means of a receiving structure which holds the individual weighing modules. For receiving structures one can use for example plates with an appropriate layout of holes, intermediate or spacer elements, frames and the like. The term "layout of holes" refers to a geometric arrangement of bore holes and cutouts at defined positions relative to each other in a body such as a plate.

As a generic feature, fastening means for the rigid connection of weighing cells with each other include not only form-fitting releasable or non-releasable connecting elements such as screws, pins, rivets, bolts and the like, but also projections, pockets, lugs, bore holes and recesses formed on the weighing cells themselves. Even displacement-limited linear-guiding constraints and the like are suitable as fastening means or fastening areas. Furthermore, the weighing cells, parallel-guiding mechanisms and in some cases the receiving structures can be connected to each other by clamping, wedging, snapping, forging, adhesive bonding, soldering, welding, potting, pressing, shrink-fitting and similar techniques used in the sense of an attachment means.

In one embodiment at least two weighing modules are arranged side-by-side. The weighing cell housings of such a row of weighing modules can be made of one piece. It is likewise possible to combine all weighing cell housings in a line or to unite them in a plate, so that all weighing cell housings are worked out of one plate and monolithically connected to each other.

In an exemplary embodiment, the force-transmitting rods that are connected to the load receivers reach all the way through the weighing cells. The upper parallel-guiding members are connected to the force-transmitting rods of the respective weighing cells in the area between the load receiver and the weighing cell. The lower parallel-guiding members are arranged on the side of the weighing cells that faces away from the load receiver, where the lower parallel-guiding members are connected to the force-transmitting rods that reach all the way through the weighing cells.

The load receiver within the present context can be configured as a device of any shape which serves the purpose of receiving the object that is to be weighed. This includes in particular a load receiver platform on which one could also fasten a superstructure, and it also includes what is commonly referred to as a weighing pan. Arranged on the load receiver itself, there can also be an additional superstructure or adapter.

Each weighing module can have its own parallel-guiding mechanism, whether made monolithically from a material block or assembled from individual components.

In an exemplary embodiment, the parallel-guiding mechanisms are combined in a plate, be it that the parallel-guiding mechanisms are assembled of individual components and connected to the plate or that they are formed directly out of the plate. The plate either spans across all weighing cells and thus contains all of the parallel-guiding mechanisms of the entire device for the weighing of uniform objects, or the parallel-guiding mechanisms are distributed over several plates which are arranged side-by-side but not necessarily on the same plane, orthogonal to the direction of the load. Of course, the weighing cells have to be rigidly connected to the plate that forms the compound of stationary parallel legs of the parallel-guiding mechanisms, with the movable parallel legs of the parallel-guiding mechanisms—which are either formed out of the plate or attached to the plate—being connected to the force-transmitting rods of their respective weighing cells.

In a further embodiment of this arrangement of weighing cells and plates, all upper parallel-guiding members are arranged in an upper compound of stationary parallel legs, and all lower parallel-guiding members are arranged in a lower compound of stationary parallel legs. The movable parallel legs of the upper compound of stationary parallel legs are connected to the force-transmitting rods of the respective weighing cells between the load receiver and the weighing cell. The movable parallel legs of the lower compound of stationary parallel legs, which are arranged on the side of the weighing cells that faces away from the load receivers, are connected to the respectively associated force-transmitting rods which reach through the weighing cells.

As an exemplary embodiment, the weighing modules can be arranged above each other in at least two planes, wherein the weighing modules in each plane are arranged either in a row or in a two-dimensional array. In order to allow the force-transmitting rods of a lower plane to extend in a suitable manner outside of the weighing modules of the upper planes, the weighing modules of a plane can be arranged with an offset relative to the weighing modules in the plane above and/or below. Each weighing module has a parallel-guiding mechanism that is completely independent of the other weighing modules.

In an exemplary embodiment, the weighing modules can be arranged in at least two planes above one another, wherein the parallel-guiding mechanisms are combined in compounds of stationary parallel legs.

If in each of the planes the upper and lower parallel-guiding members of the weighing modules are combined in an upper and a lower compound of stationary legs, the possibility presents itself to combine stationary leg compounds that are arranged between two planes, so that the combined stationary leg compound that lies between the planes carries parallel-guiding members belonging to the weighing cells of the upper plane as well as parallel-guiding members belonging to the weighing cells of the lower plane. The number of planes on which the weighing modules can be arranged depends on the dimensions of the weighing modules and on the required number of load receivers, wherein the latter number, in turn, depends on the way in which the weighing objects are transported to the load receivers.

If weighing modules in an arrangement with a plurality of planes are equipped with force-transmitting rods of different lengths, for example in order to arrange the load receivers in one plane, the weighing modules will have different preloads. These different preloads can be made equal by, for example, means of a compensating weight, for example by adding a screw to the weighing modules with the shorter force-transmitting rods. If the spatial conditions permit, the compensating weight, more specifically the preload compensating weight can be attached in the connecting area between the force-transmitting rod and the movable parallel leg of the parallel-guiding mechanism.

BRIEF DESCRIPTION OF THE DRAWINGS

Details of exemplary weighing modules and devices for weighing objects of a uniform nature may be learned from the description of the embodiments, in conjunction with the drawings, wherein:

FIGS. 2a-2c represent different exemplary versions of rotationally symmetric parallel-guiding diaphragms with concentrically profiled parallel-guiding members, wherein FIGS. 2a to 2c represent sectional views and only one of the two parallel-guiding diaphragms is shown that are used to form a parallel-guiding mechanism;

FIGS. 3a-3c represent different exemplary versions of flat parallel-guiding diaphragms with perforations, shown in a plan view in FIGS. 3a to 3c;

DETAILED DESCRIPTION

Figure 1:
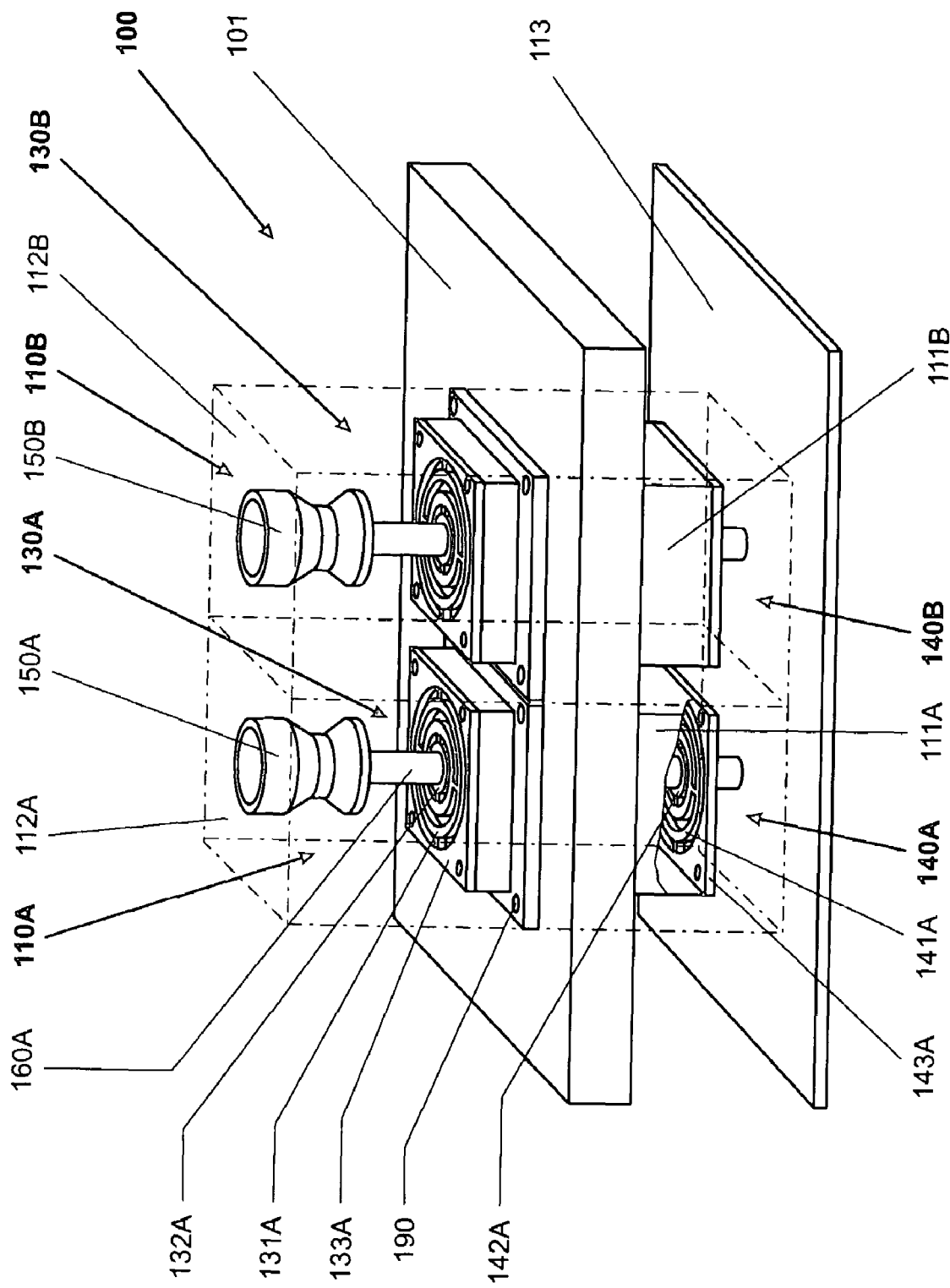
FIG. 1 represents a perspective view of an exemplary receiving structure with two weighing modules which have parallel-guiding diaphragms arranged above the weighing cell and below the weighing cell, and it also shows an exemplary design space occupied by a weighing module.

In the perspective representation of FIG. 1, an exemplary receiving structure 101 is shown with two weighing modules 110A, 110B, together constituting an exemplary device 100 for the weighing of substantially uniform objects. Each of the weighing modules 110A, 110B has a weighing cell 111A, 111B with a load receiver 150A, 150B. Each of the weighing modules 110A, 110B is arranged within a design space 112A, 112B. Each dimension of a design space in the plane that extends orthogonal to the load direction is delimited by the design spaces occupied by the neighboring weighing cells or represents the largest dimension of the weighing cell 111A, 111B in said plane within the respective design space 112A, 112B. The dimension in the load direction is delimited for example by a housing floor 113 that is solidly connected to the receiving structure. The limits of the design spaces 112A, 112B against the load direction are formed, e.g., by the upper rims of the load receivers 150A, 150B, because the space above the load receivers 150A, 150B is normally taken up by the operating space of a conveyor device which is not shown in the drawing.

The weighing module 110A is rigidly connected to the receiving structure 101 by fastening means 190, for example by screws. The weighing cell 111A of the weighing module 110A has a coil (not shown in the drawing) which is arranged in the interior of the weighing cell 111A and which is connected to a force-transmitting rod 160A that traverses the weighing cell 111A in the direction of the load. Attached to the upper end of the force-transmitting rod 160A is the load receiver 150A.

Arranged between the load receiver 150A and the weighing cell 111A is an upper parallel-guiding diaphragm 130A whose upper parallel-guiding member 131A connects the upper movable parallel leg 132A at a predefined guiding distance with the upper stationary parallel leg 133A.

The term "guiding distance" refers to the direct distance between the movable parallel leg 132A and the stationary parallel leg 133A of the parallel-guiding diaphragm 130A. Within this concept it is irrelevant how the parallel-guiding member 131A connecting the two parallel legs is configured.

However, the parallel-guiding member 131A is configured so that its effective length is significantly larger than the guiding distance of the parallel-guiding diaphragm 130A. The effective length is defined as the actual stretched-out length or the length of the bending-stress-neutral core fiber of the parallel-guiding member 131A inclusive of the connecting areas to the parallel legs 132A, 133A.

The upper movable parallel leg 132A is connected to the force-transmitting rod 160A, and the upper stationary parallel leg 133A is fastened to the weighing cell 111A. Likewise, a lower parallel-guiding diaphragm 140A is arranged on the side of the weighing cell 111A that faces away from the load receiver 150A, with a lower parallel-guiding member 141A connecting the lower movable parallel leg 142A to the lower stationary parallel leg 143A, as shown in the cutaway drawing of the weighing cell 111A in FIG. 1. Also, the lower movable parallel leg 142A is connected to the force-transmitting rod 160A, and the lower stationary parallel leg 143A is fastened to the weighing cell 111A.

The description of the weighing module 110A applies analogously to the weighing module 110B and to its upper parallel-guiding diaphragm 130B and lower parallel-guiding diaphragm 140B.

To exchange adjacent weighing modules 110A, 110B in an exemplary weighing device 100 for uniform weighing objects, no part of any weighing module 110A protrudes beyond the boundaries of its respective design space 112A. The movable parallel leg 132A is arranged inside the design space 112A. In an exemplary case, the outside contour of the movable parallel leg 132A, of the parallel-guiding member 131A or the stationary parallel leg 133A can correspond to the outside contour of the design space in a cross-sectional plane orthogonal to the load direction.

Of course, this arrangement is not limited to two weighing modules 110A, 110B. Any number of weighing modules can be arranged in a two-dimensional layout behind each other or side-by-side, where in each case two neighboring weighing cells are grouped, for example, in the illustrated manner.

FIG. 2 shows different designs of parallel-guiding diaphragms, without covering all possibilities. FIGS. 2a to 2c represent sectional views of exemplary rotationally symmetric parallel-guiding diaphragms 20, 30, 40 which are identical in their design except for the cross-sectional profile of the parallel-guiding members 21, 31, 41. A rotationally symmetric parallel-guiding diaphragm 20, 30, 40 is arranged between the load receiver (not shown in the drawing) and the weighing cell 1000, wherein the stationary parallel leg 23, 33, 43 is rigidly connected to the weighing cell 1000. The movable parallel leg 22, 32, 42 of the rotationally symmetric parallel-guiding diaphragm 20, 30, 40 is rigidly connected to the force-transmitting rod 1600. Arranged between the stationary parallel leg 23, 33, 43 and the movable parallel leg 22, 32, 42 and connecting the two parallel legs is the parallel-guiding member 21, 31, 41 which—seen in the direction of the load—is configured with rotational symmetry. The parallel-guiding member 21, 31, 41 is profiled concentrically, where the exemplary illustrated possibilities include a saw-tooth-shaped cross-sectional profile of the parallel leg 21, a trapeze-shaped cross-sectional profile of the parallel leg 31, or a sinusoidal cross-sectional profile of the parallel leg 41. In order to constrain the force-transmitting rod 1600 in parallel-guided motion, a second parallel-guiding diaphragm 20, 30, 40 can be included (not shown in FIGS. 2a to 2c) which is identical to the rotationally symmetric parallel-guiding diaphragm 20, 30, 40 and arranged at a distance from and parallel to the first parallel-guiding diaphragm 20, 30, 40.

FIG. 3a shows in a plan view an exemplary parallel-guiding diaphragm 50 in which the outside contour of the stationary parallel leg 53 conforms to the cross-section of the design space orthogonal to the load direction of a weighing module. A meander-shaped arrangement of elastically resilient parallel-guiding members 51 is formed by means of U-shaped perforations 56 which are cut orthogonally to the plane of the parallel-guiding diaphragm 50. These parallel-guiding members 51 connect the movable parallel leg 52 in the middle of the parallel-guiding diaphragm to the stationary parallel leg 53, with the stationary parallel leg 53 forming a closed frame surrounding the parallel-guiding members 51 and the movable parallel leg 52 in the plane of the parallel-guiding diaphragm 50. Holes 54 in the border area of the stationary parallel leg 53 serve for the fixed attachment of the parallel-guiding diaphragm 50 to a weighing cell housing. The movable parallel leg 52 has a passage hole 55 for the connection to the force-transmitting rod that belongs to the weighing cell.

FIG. 3*b* shows in a plan view an exemplary parallel-guiding diaphragm 60 in which the outside contour of the stationary parallel leg 63 conforms to the cross-section of the design space orthogonal to the load direction of a weighing module. An arrangement of elastically resilient parallel-guiding members 61 is formed by a serial and parallel combination of a plurality of leaf springs delimited by means of U-shaped and angle-shaped perforations 66 which are cut orthogonally to the plane of the parallel-guiding diaphragm 60. These parallel-guiding members 61 connect the movable parallel leg 62 in the middle of the parallel-guiding diaphragm 60 to the stationary parallel leg 63, with the stationary parallel leg 63 forming a closed frame surrounding the parallel-guiding members 61 and the movable parallel leg 62 in the plane of the parallel-guiding diaphragm 60. Holes 64 in the border area of the stationary parallel leg 63 serve for the fixed attachment of the parallel-guiding diaphragm 60 to a weighing cell housing. The movable parallel leg 62 has a passage hole 65 for the connection to the force-transmitting rod that belongs to the weighing cell.

The perforations need not necessarily have rectangular changes in direction; angles of more than 90° or less than 90° are also possible, corresponding to a star-shaped arrangement of the parallel-guiding members 61. Instead of U-shaped perforations 66 it is also possible to have M-shaped perforations 66 or any other suitable shape.

FIG. 3*c* shows in a plan view an exemplary parallel-guiding diaphragm 70 in which the outside contour of the stationary parallel leg 73 conforms to the cross-section of the design space orthogonal to the load direction of a weighing module. An arrangement of annular spring segments 77 that are connected to each other by material bridges 78 is formed by arcuate perforations 76 arranged coaxially to the center of the parallel-guiding diaphragm which are cut orthogonally to the plane of the parallel-guiding diaphragm 70. Each of the annular spring segments 77 is connected to the next annular spring segment by two material bridges, wherein the two material bridges 78 between two annular spring segments 77 are arranged at 180° relative to each other and parallel to two opposite sides of the outside contour. Furthermore, the material bridges of neighboring annular spring segments 77 are offset relative to each other by 90° in order to maximize the effective length of the parallel-guiding member 71. The latter connects the movable parallel leg 72 in the middle of the parallel-guiding diaphragm 70 to the stationary parallel leg 73, with the stationary parallel leg 73 forming a closed frame surrounding the parallel-guiding member 71 and the movable parallel leg 72 in the plane of the parallel-guiding diaphragm 70. Holes 74 in the border area of the stationary parallel leg 73 serve for the fixed attachment of the parallel-guiding diaphragm 70 to a weighing cell housing. The movable parallel leg 72 has a passage hole 75 for the connection to the force-transmitting rod that belongs to the weighing cell.

Figure 4C:
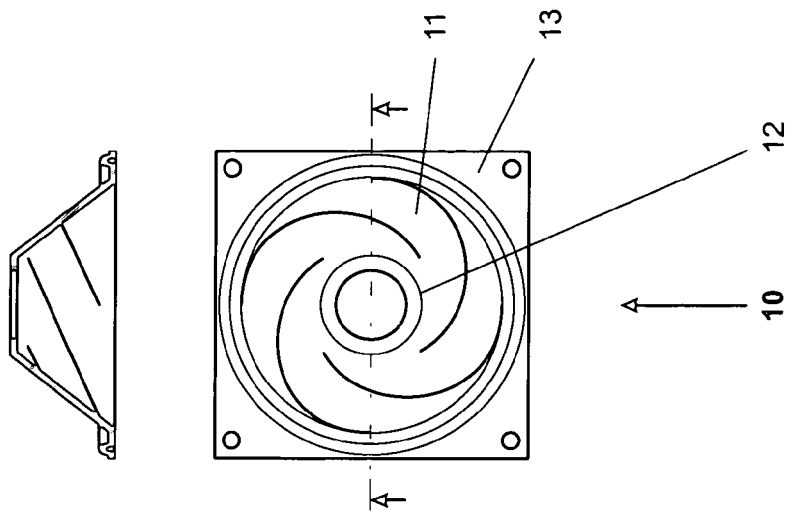
FIGS. 4a-4c represent different exemplary design versions of parallel-guiding diaphragms with perforations and stiffening features on the stationary parallel leg, shown in a plan view in FIGS. 4a to 4c.
Figure 4B:
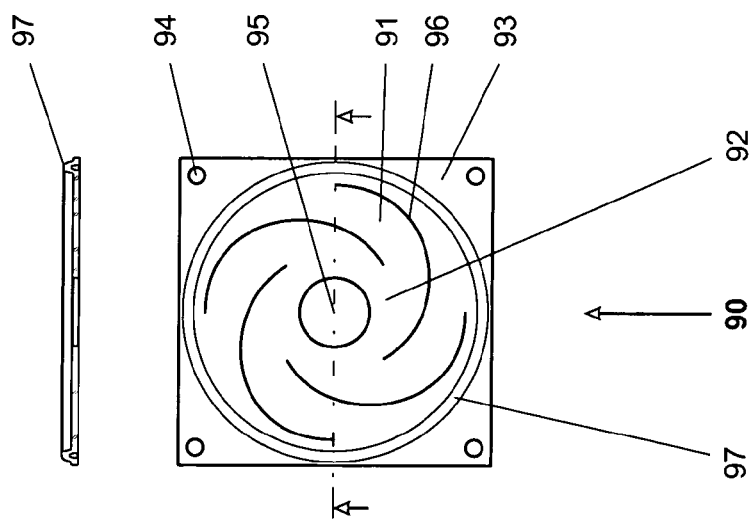
Figure 4A:
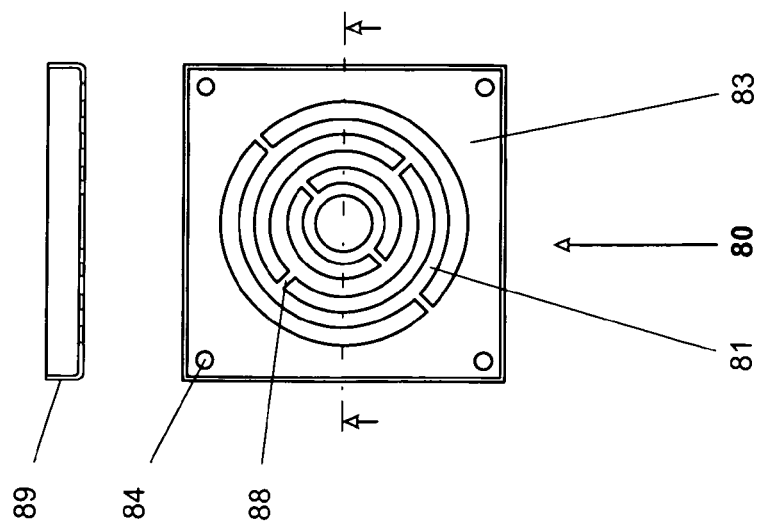

FIG. 4*a* shows a plan view as well as a sectional view of an exemplary parallel-guiding diaphragm 80, whose design is to a large extent analogous to the parallel-guiding diaphragm that was described in detail in connection with FIG. 3*c*. As a difference to the embodiment of FIG. 3*c*, the border areas 89 of the stationary parallel leg 83 are folded at an angle all the way around the perimeter in order to stiffen the stationary parallel leg 83. Furthermore, the material bridges 88 of the parallel-guiding member 81 are aligned to point to the holes 84 in the stationary parallel leg 83, i.e., diagonal to the square outside contour of the stationary parallel leg 83. The holes 84 serve to fasten the stationary parallel leg 83 to a weighing cell through fastening means.

FIG. 4*b* shows a plan view as well as a sectional view of an exemplary parallel-guiding diaphragm 90, in which the outside contour of the stationary parallel leg 93 conforms to the cross-section of the design space orthogonal to the load direction of a weighing module. An arrangement of spiral-shaped elastically resilient parallel-guiding members 91 is formed by spiral-shaped perforations 96 which are cut orthogonally to the plane of the parallel-guiding diaphragm 90. The parallel-guiding members 91 connect the movable parallel leg 92 in the middle of the parallel-guiding diaphragm 90 to the stationary parallel leg 93, with the stationary parallel leg 93 forming a closed frame surrounding the parallel-guiding members 91 and the movable parallel leg 92 in the plane of the parallel-guiding diaphragm 90. Holes 94 in the border area of the stationary parallel leg 93 serve for the fixed attachment of the parallel-guiding diaphragm 90 to a weighing cell housing. The movable parallel leg 92 has a passage hole 95 for the connection to the force-transmitting rod that belongs to the weighing cell. A stiffening bead 97 is impressed all the way around the stationary parallel leg 93 to make the latter more rigid. The inside border of the stiffening bead 97 is arranged in immediate proximity to the ends of the spiral-shaped perforations 96 at the far side from the passage hole 95. Of course, the stiffening bead 97 does not need to be arranged concentrically to the passage hole 95. The stiffening bead 97 can also be configured in the shape of a polygon in the plane of the parallel-guiding diaphragm 90, or it can be interrupted. Instead of an impressed bead 97, the stiffening of the stationary parallel leg 93 can also be accomplished by a projecting rib that is produced by milling and thus monolithically connected to the stationary parallel leg 93, or by a projecting rib that is produced as an additional component which is attached to the stationary parallel leg 93 by a form-locking, materially bonded, or force-tightened connection.

FIG. 4*c* illustrates an exemplary parallel-guiding diaphragm 10 that is nearly identical to the parallel-guiding diaphragm shown in FIG. 4*b*, but has a configuration where the movable parallel leg 12 is arranged in a plane that extends parallel to and at a distance from the plane of the stationary parallel leg 13. The spiral-shaped parallel-guiding members 11 thus wind along a cone surface from the stationary parallel leg 13 to the movable parallel leg 12. As described in the context of FIG. 2*a*, each of parallel-guiding mechanisms that have parallel-guiding diaphragms can have two parallel-guiding diaphragms. When the parallel-guiding diaphragm of FIG. 4*c* is used, the frusto-conical structure of the first and second parallel-guiding diaphragms 10 can be oriented in the same direction, so that the parallel-guiding diaphragms are parallel also with regard to their shapes. However, the frusto-conical structure of the second parallel-guiding diaphragm 10 can also point in the opposite direction of the frusto-conical structure of the first parallel-guiding diaphragm 10. Furthermore, it is of course also possible for the frusto-conical structures of the two parallel-guiding diaphragms 10 to be oriented so that they point towards each other, meaning that the movable parallel legs 12 are arranged closer to each other than the stationary parallel legs 13.

Figure 5:
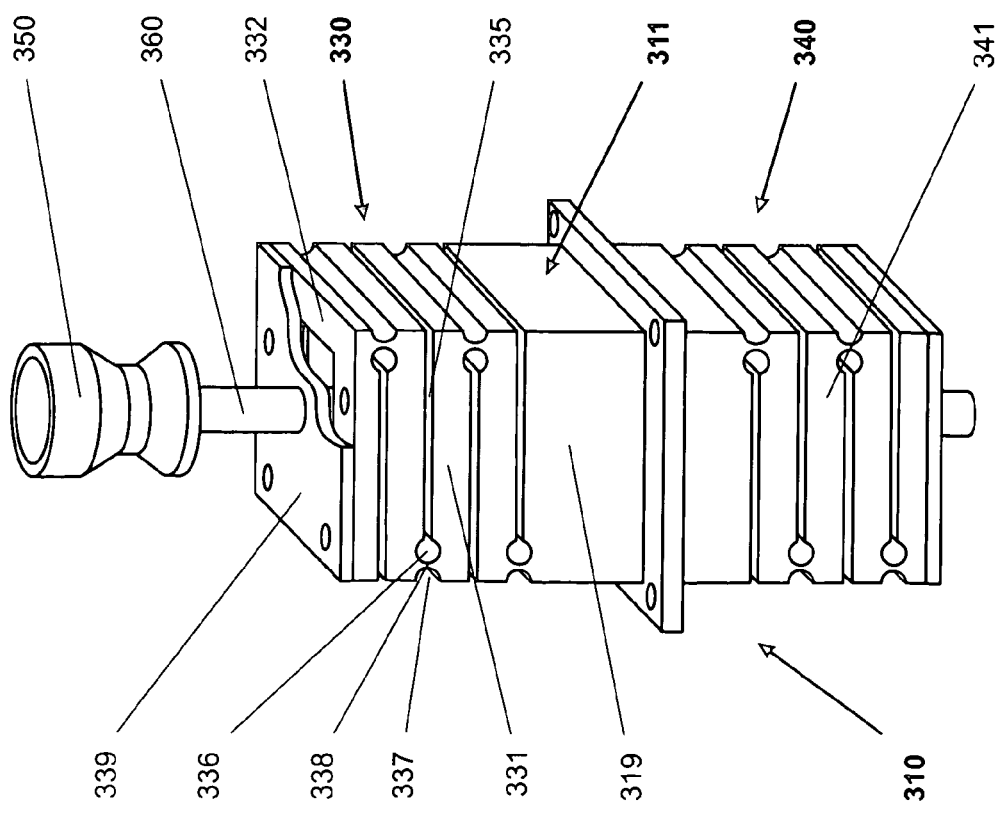
FIG. 5 represents a perspective view of an exemplary weighing module with parallel-guiding members arranged above and below the weighing cell which are monolithically connected to the weighing cell and folded meander-like in the vertical dimension.

FIG. 5 shows a perspective view of an exemplary weighing module 310 whose weighing cell 311 follows in essence the same design concept as the weighing cell described in the context of FIG. 1. As a difference to the weighing modules shown in FIG. 1, the weighing module 310 has an upper parallel-guiding part 330 arranged between the load receiver 350 and the weighing cell 311, and a lower parallel-guiding part 340 arranged on the side of the weighing cell that faces away from the load receiver 350, wherein the parallel-guiding parts 330 and 340 are monolithically connected to the weighing cell housing 319 of the weighing cell 311. The upper parallel-guiding member 331 is folded in a plane that contains the load direction. Three cuts 335, open on three sides and cutting into the load cell housing 319 in planes that are orthogonal to the load direction, form the upper parallel-guiding member 331. The cuts follow each other in a sequence where cuts 335 that are adjacent to each other in the direction of the load enter from opposite sides. Thin flexure joints 338 are formed by widened ends 336 at the bottoms of the cuts 335 and by recesses 337 in the same planes as the cuts 335 but on the side of the weighing cell housing not traversed by the respective cut. The segments of the parallel-guiding member 331 that are formed by the cuts are connected by the thin flexure joints 338 to each other, to the movable parallel leg 332, and to the weighing cell housing 319. An end plate 339 establishes the connection between the movable parallel leg 332 and the force-transmitting rod 360. The lower parallel-guiding part 340 with its parallel-guiding member 341 is configured analogous to the upper parallel-guiding part 330.

Of course, the parallel-guiding member 331 can also be configured to be elastically flexible, so that no thin flexure joints 338 are necessary.

Figure 6:
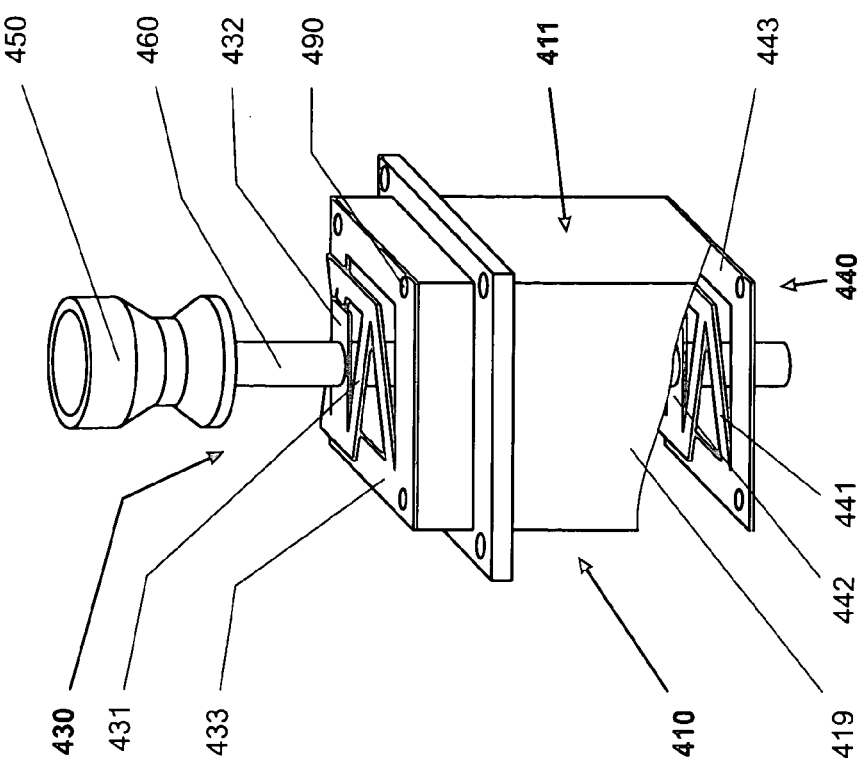
FIG. 6 represents a perspective view of an exemplary weighing module with parallel-guiding members arranged above and below the weighing cell which are connected to the weighing cell, folded meander-like, and configured in the shape of a pyramid.

FIG. 6 gives a perspective view of an exemplary weighing module 410 with an upper parallel-guiding diaphragm 430 arranged between the load receiver 450 and the weighing cell 411, and with an upper stationary parallel leg 433 fastened to the weighing cell housing 419 of the weighing cell 411 through fastener means 490. On the side of the weighing 411 that faces away from the load receiver 450, the lower stationary parallel leg 443 of the lower parallel-guiding diaphragm 440 is fastened likewise to the weighing cell housing 419. The upper parallel-guiding diaphragm 430 corresponds to the diaphragm shown in FIG. 3a, but the upper movable parallel leg 432 with the connection to the load-transmitting rod 460 is arranged relative to the stationary parallel leg 433 with an offset in the opposite direction of the load. The offset upper movable parallel leg 432, the upper stationary parallel leg 433 and the upper parallel-guiding member 431 together form a parallel-guiding diaphragm 430 with a meandering pattern and shaped like a pyramid. The same also applies to the lower parallel-guiding diaphragm 440 whose lower parallel-guiding member 441 is connected through the lower movable parallel leg 442 to the force-transmitting rod 442 which traverses the weighing cell 411, as can be seen in the breakaway representation of the weighing cell housing 419. However, the lower movable parallel leg 442 does not necessarily have to be offset in the same direction—in this case against the direction of the load—as the upper movable parallel leg 432, but it can also be offset in the same direction as the load relative to the lower stationary parallel leg 443.

Figure 7:
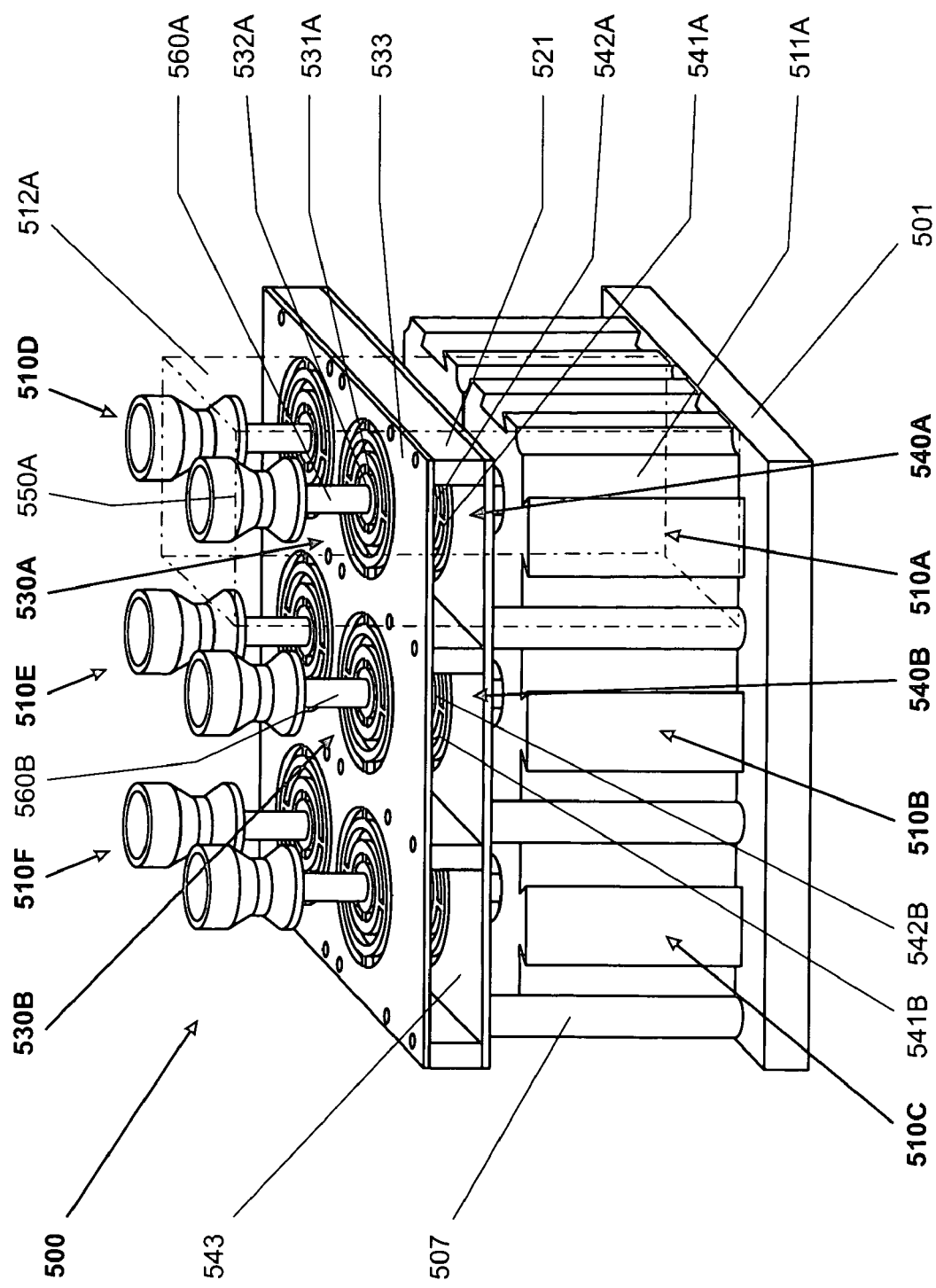
FIG. 7 represents a perspective view of an exemplary device with six weighing modules mounted on a plate-shaped receiving structure, wherein the parallel-guiding mechanisms are arranged above the weighing cells in plate-shaped compounds of stationary parallel legs, and it also schematically shows the exemplary design space occupied by a weighing module.

FIG. 7 shows a perspective representation of an exemplary device 500 for the weighing of substantially uniform weighing objects with a two-dimensional arrangement of weighing modules 510A, 510B, 510C, 510D, 510E, 510F. The weighing module 510A is rigidly connected to a receiving structure 501 by means of fasteners (not shown in the drawing) such as screws and includes a weighing cell 511A with a coil (not shown) arranged in its interior which is connected to a force-transmitting rod 560A. Attached to the upper end of the force-transmitting rod 560A is the load receiver 550A. The force-transmitting rod 560A is connected to the upper movable parallel leg 532A. The upper parallel-guiding member 531A, the upper movable parallel leg 532A and the upper stationary parallel leg together form the upper parallel-guiding diaphragm 530A. The upper parallel-guiding member 531A and the upper movable parallel leg 532 are of an analogous configuration as the upper parallel-guiding diaphragm 130A of FIG. 1.

The upper parallel-guiding diaphragms 530A, 530B, ... of all of the weighing modules 510A, 510B, 510C, 510D, 510E, 510F whose configuration is analogous to the weighing module 510A of the foregoing description are formed, for example, out of a monolithic plate wherein the material-free spaces can be produced by milling, drilling, punching, laser- or water-jet cutting techniques, by means of spark erosion, photo-etching technology and the like. As a result, all of the upper parallel-guiding diaphragms 530A, 530B, ... can have a common upper compound of stationary parallel legs 533.

A second plate of, for example, completely identical design with the lower parallel-guiding diaphragms 540A, 540B, ... constitutes the lower compound of stationary parallel legs 543, wherein the lower movable parallel legs 542A, 542B, ... are connected by way of the lower parallel-guiding members 541A, 541B, ... to the compound of stationary parallel legs 543. The positions of the lower movable parallel legs 542A, 542B, ... which are formed out of the plate can be precisely aligned with the corresponding upper movable parallel legs 532A, 532B, ... to which they are connected through the force-transmitting rods 560A, 560B, ... so as to allow the latter to be constrained in a parallel-guided mode of displacement. The upper stationary compound of parallel legs 533 and the lower stationary compound of parallel legs 543 are solidly connected to each other through spacer elements 521. The two compounds of stationary parallel legs 533, 543 which are solidly connected to each other are fixedly mounted on the receiving structure 501 by way of support columns 507.

In the weighing module 510A, the upper movable parallel leg 532A and the lower movable parallel leg 542A are connected to the force-transmitting rod 560A of the weighing module 510A, wherein the movable parallel legs 532A and 542A are arranged at the same distance from each other as the upper compound of stationary parallel legs 533 and the lower compound of stationary parallel legs 543.

The broken lines indicating the design space 512A of the weighing module 510A in the drawing serve to visualize how the weighing module 510A can be delimited against the adjoining weighing modules and also how the upper parallel-guiding diaphragm 530A and the lower parallel-guiding diaphragm 540A can be delimited against the adjoining parallel-guiding diaphragms in the compounds of parallel legs 533, 543.

In the same manner as shown for the weighing module 510A, all of the force-transmitting rods of the weighing modules 510A, 510B, 510C, 510D, 510E, 510F can be likewise connected to their respective movable parallel legs.

Of course, this arrangement is not limited to six weighing modules 510A, 510B, 510C, 510D, 510E, 510F. Any number of weighing modules can be arranged in a two-dimensional layout behind each other and side-by-side, wherein the upper compound of stationary parallel legs 533 and the lower compound of stationary parallel legs 543 has to be adapted to the number of weighing cells.

Figure 8:
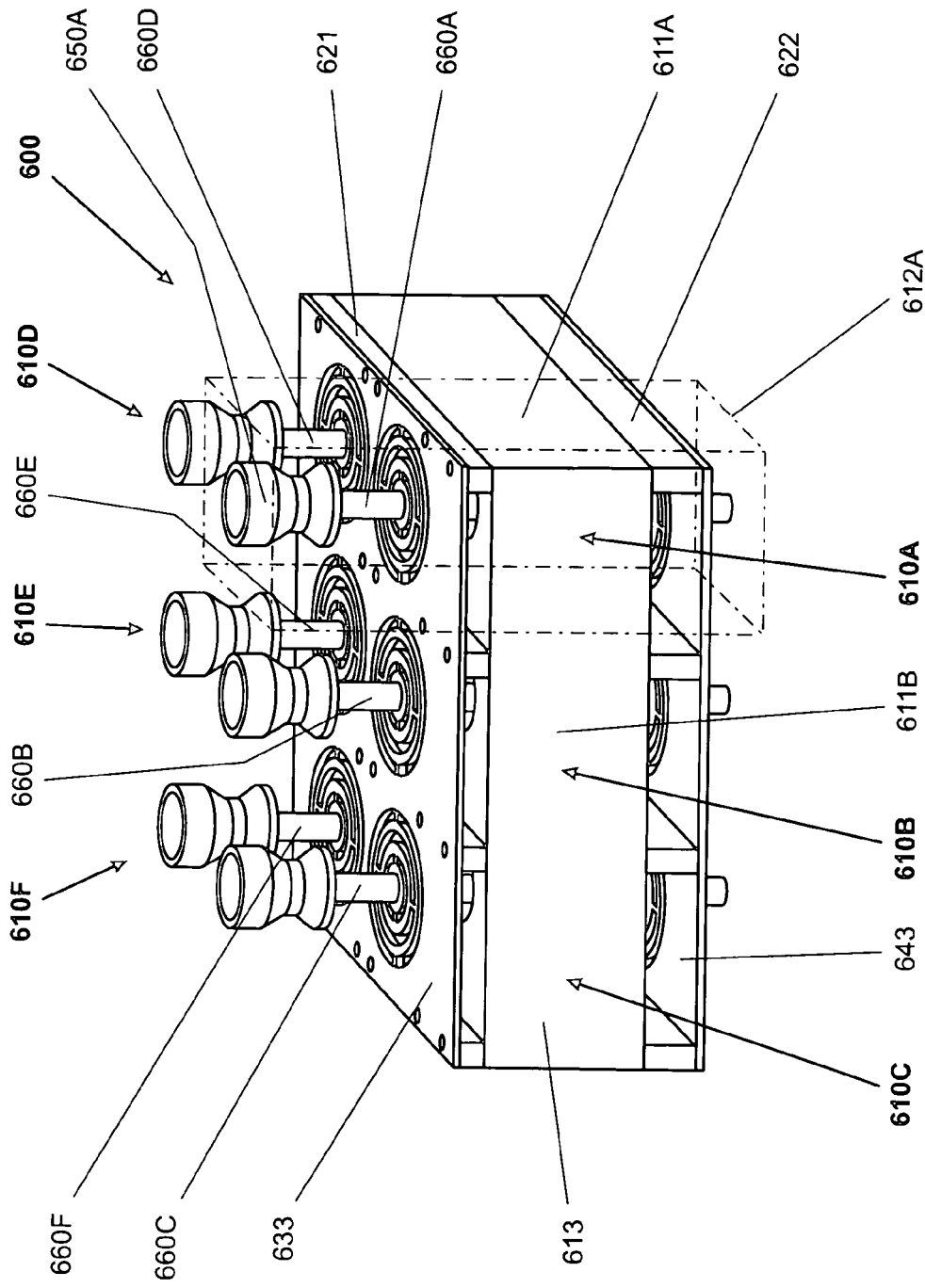
FIG. 8 represents a perspective view of an exemplary device with six weighing modules, wherein the weighing cell housings of the modules are monolithically combined with each other and the parallel-guiding mechanisms are constrained in plate-shaped compounds of stationary parallel legs, with the upper compound of stationary parallel legs being positioned between the load receivers and the weighing cells, and the lower compound of stationary parallel legs being arranged on the side of the weighing cells that faces away from the load receivers, and it also schematically shows an exemplary design space occupied by a weighing module.

FIG. 8 shows a perspective representation of an exemplary device 600 for the weighing of substantially uniform weighing objects with a two-dimensional arrangement of weighing modules 610A, 610B, 610C, 610D, 610E, 610F whose weighing cell housings are monolithically connected to each other in a weighing cell housing compound 613. This device 600 for the weighing of substantially uniform weighing objects has an upper compound of stationary parallel legs 633 and a lower compound of stationary parallel legs 643 which are of a largely analogous design as the parallel leg compounds in FIG. 7. Each of the weighing modules 610A, 610B, ... likewise includes, respectively, a weighing cell 611A, 611B, ... with a load receiver 650A, 650B, ... The broken lines indicating the design space 612A of the weighing module 610A in the drawing serve to visualize how the weighing module 610A is delimited against the adjoining weighing modules and also how the monolithically connected stationary parallel legs are delimited. A feature that differs from FIG. 7 is that the upper compound of parallel legs is connected directly through spacer elements 621 to the weighing cell housing compound 613. In addition, the lower compound of parallel legs 643 is solidly connected through distance-holding elements 622 to the weighing cell housing compound 613 on the side of the weighing cells 611A, 611B that faces away from the load receivers 650A, 650B .... The force-transmitting rods 660A, 660B ... pass through the respective weighing cells 611A, 611B, ... in the load direction. The upper movable parallel legs and the lower movable parallel legs belonging to the weighing modules 610A, 610B, 610C, 610D, 610E, 610F are connected, respectively, to the force-transmitting rods 660A, 660B, 660C, 660D, 660E, 660F.

Of course, this arrangement is not limited to six weighing modules 610A, 610B, 610C, 610D, 610E, 610F. Any number of weighing modules can be arranged in a two-dimensional layout behind each other and side-by-side, wherein the upper compound of stationary parallel legs 633 and the lower compound of stationary parallel legs 643 has to be adapted to the number of weighing cells.

Figure 9:
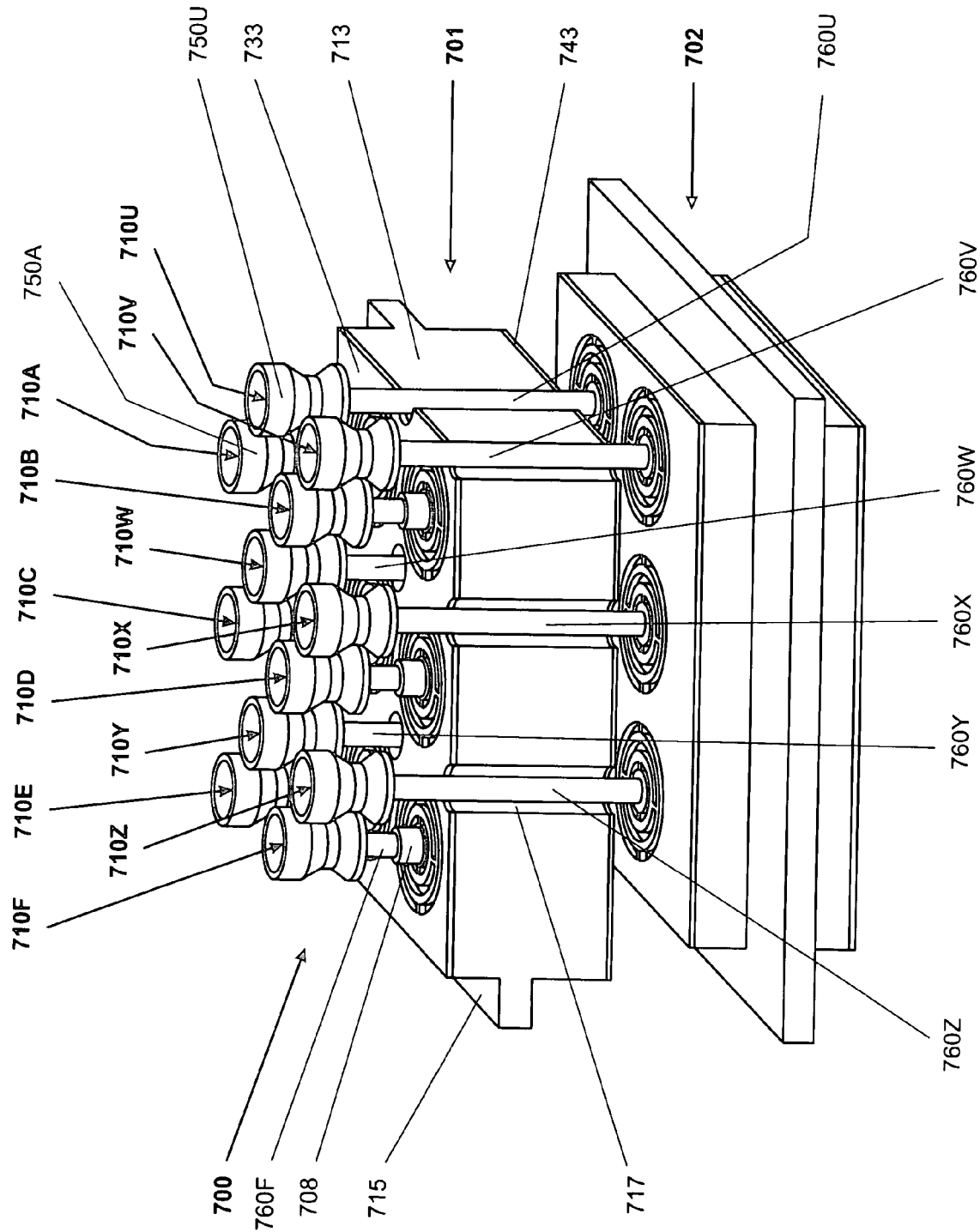
FIG. 9 shows a perspective view of an exemplary device in which two arrays of six weighing modules are arranged, respectively, in two planes with the arrays being offset relative to each other, wherein the parallel-guiding mechanisms of each array are arranged above and below the weighing cells.

FIG. 9 shows a perspective representation of an exemplary device 700 for the weighing of substantially uniform weighing objects with two two-dimensional layouts of weighing modules of the kind described above in the context of FIG. 8, which are arranged, respectively, on a first plane 701 and a second plane 702. However, the upper compound of parallel legs 733 and the lower compound of parallel legs 743 are not connected to the weighing cell housing compound 713 by way of distance-holding elements and spacer elements but rather through a direct rigid connection. The weighing modules 710A, 710B, 710C, 710D, 710E, 710F of the upper plane 701 are rigidly connected to each other through the weighing cell housing compound 713. A continuous flange 715 is formed around the weighing cell housing compound 713 which serves to connect the weighing modules of the plane 701 and the weighing modules of the plane 702 through a receiving structure which is not shown here. The weighing modules 710U, 710V, 710W, 710X, 710Y, 710Z of the lower plane 702 are rigidly connected to each other in like manner as the weighing modules of the upper plane 701.

The plane 701 is arranged at an offset position relative to the plane 702, so that the force-transmitting rods 760U, 760V, 760W, 760X, 760Y, 760Z of the weighing modules 710U, 710V, 710W, 710X, 710Y, 710Z of the lower plane 702 can be arranged to bypass the weighing modules 710A, 710B, 710C, 710D, 710E, 710F of the upper plane 701. With this layout, the load receivers 750U, ... of the lower plane 702 and the load receivers 750A, ... of the upper plane 701 lie in a common plane that runs orthogonal to the load direction. To make this arrangement possible, the weighing cell housing compound 711 of the upper plane 701 can have channels 717 for the force-transmitting rods 760U, 760V, 760W, 760X, 760Y, 760Z of the lower plane 702 to pass through.

Each weighing cell, regardless of whether it belongs to the upper plane 701 or to the lower plane 702, can be under the same load conditions with regard to the load receiver and the force-transmitting rod which constitute the so-called preload. Because the force-transmitting rods 760U, 760V, 760W, 760X, 760Y, 760Z can be significantly longer than the force-transmitting rods 760A, ... and have a larger mass, the preload difference between the weighing modules of the upper plane 701 and the lower plane 702 can be evened out by means of a preload compensation weight 708 that is attached to the force-transmitting rod of each of the weighing modules 710A, 710B, 710C, 710D, 710E, 710F of the upper plane 701.

Of course, this arrangement is not limited to six weighing modules 710A, 710B, 710C, 710D, 710E, 710F and six weighing modules 710U, 710V, 710W, 710X, 710Y, 710Z. Any number of weighing modules can be arranged in each of the planes 701, 702 in the manner illustrated, i.e., in a two-dimensional layout behind each other and side-by-side.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| List of Reference Symbols | |
|---|---|
| 20, 30, 40 | rotationally symmetric parallel-guiding diaphragm |
| 11, 21, 31, 41, 51, 61, 71, 81, 91 | parallel-guiding member |
| 12, 22, 32, 42, 52, 62, 72, 92 | movable parallel leg |
| 13, 23, 33, 43, 53, 63, 73, 83, 93 | stationary parallel leg |
| 10, 50, 60, 70, 80, 90 | parallel-guiding diaphragm |
| 54, 64, 74, 84, 94 | hole |
| 55, 65, 75, 95 | passage hole |
| 56, 66, 76, 96 | perforation |
| 77 | annular spring segment |
| 78, 88 | material bridge |
| 89 | border area |
| 97 | stiffening bead |
| 100, 500, 600, 700 | device for weighing substantially uniform objects |
| 101, 501 | receiving structure |
| 110A-B, 310, 410, 510A-F, 610A-F, 710A-F, 710U-Z | weighing module |
| 111A-B, 311, 411, 511A, 611A-B, 1000 | weighing cell |
| 112A-B, 512A, 612A | design space |
| 113 | housing floor |
| 130A-B, 430, 530A-B | upper parallel-guiding diaphragm |
| 131A, 331, 431, 531A | upper parallel-guiding member |
| 132A, 332, 432, 532A | upper movable parallel leg |
| 133A, 433 | upper stationary parallel leg |
| 140A-B, 440, 540A-B | lower parallel-guiding diaphragm |
| 141A, 341, 441 | lower parallel-guiding member |
| 142A, 442 | lower movable parallel leg |
| 143A, 443 | lower stationary parallel leg |
| 150A-B, 350, 450, 550A, 650A, 750A, 750U | load receiver |
| 160A, 360, 460, 560A-B, 660A-F, 760F, 760U-Z, 1600 | force-transmitting rod |
| 190, 490 | fastening means |
| 319, 419 | weighing cell housing |
| 330 | upper parallel-guiding part |
| 335 | cut |
| 336 | widened end of cut |
| 337 | recess |
| 338 | thin flexure joint |
| 339 | end plate |
| 340 | lower parallel-guiding part |
| 507 | support column |
| 521, 621 | spacer element |
| 533, 633, 733 | upper compound of stationary parallel legs |
| 541A-B | lower parallel-guiding member |
| 542A-B | lower movable parallel leg |
| 543, 643, 743 | lower compound of stationary parallel legs |
| 613, 713 | weighing cell housing compound |
| 622 | distance-holding element |
| 701 | first plane |
| 702 | second plane |
| 708 | preload-compensating weight |
| 715 | continuous flange |
| 717 | channel |

The invention claimed is:

1. Weighing module, comprising:
   a load receiver; and
   a weighing cell connected to the load receiver by a force-transmitting rod, wherein the weighing module is arranged inside a design space whose dimensions in a plane extending orthogonal to a load direction are limited by design spaces occupied by neighboring weighing cells or represent the largest dimension of the weighing cell in said plane, and wherein said weighing cell includes:

a parallel-guiding mechanism which has at least one movable parallel leg connected to the force-transmitting rod and at least one stationary parallel leg, and wherein said parallel legs are arranged relative to each other at a predefined guiding distance and are connected to each other by at least one upper parallel-guiding member and at least one lower parallel-guiding member, the force-transmitting rod being arranged substantially geometrically centrally within the parallel guiding mechanism; wherein:

an actual stretched-out length or length of bending-stress-neutral core fibers of the parallel-guiding members, inclusive of the connecting areas to the parallel legs and, if applicable, inclusive of thin flexure joints belonging to the parallel-guiding members, is larger than said guiding distance, and wherein the movable parallel leg does not protrude out of the design space of the weighing module.

2. Weighing module according to claim 1, wherein the at least one upper parallel-guiding member and the at least one lower parallel-guiding member are configured to meander in a plane that contains the load direction.

3. Weighing module according to claim 1, wherein the at least one upper parallel-guiding member together with an upper movable parallel leg and an upper stationary parallel leg are shaped into an upper parallel-guiding diaphragm, and the at least one lower parallel-guiding member together with a lower movable parallel leg and a lower stationary parallel leg are shaped into a lower parallel-guiding diaphragm.

4. Weighing module according to claim 3, wherein the at least one upper parallel-guiding member and the at least one lower parallel-guiding member are configured to meander in the plane that extends orthogonal to the load direction by perforations cut in a direction of the load.

5. Weighing module according to claim 3, wherein the at least one upper parallel-guiding member and the at least one lower parallel-guiding member are configured with a meandering pattern in a pyramid shape.

6. Weighing module according to claim 3, wherein the at least one upper parallel-guiding member and the at least one lower parallel-guiding member are formed by spiral-shaped perforations that are cut in the load direction and extend from the stationary parallel leg towards the movable parallel leg in a plane that is orthogonal to the load direction.

7. Weighing module according to claim 3, wherein the at least one upper parallel-guiding member and the at least one lower parallel-guiding member are configured with a spiral pattern in a cone shape extending from the stationary parallel leg to the movable parallel leg and the movable parallel leg is arranged in a plane that extends parallel to and at a distance from the plane of the stationary parallel leg.

8. Weighing module according to claim 3, wherein the parallel-guiding diaphragms are profiled concentrically and the cross-sectional profile of the parallel-guiding members is configured sawtooth-shaped, trapeze-shaped, or sinusoidal-shaped.

9. Weighing module according to claim 3, wherein the at least one upper parallel-guiding member and the at least one lower parallel-guiding member are configured in the shape of spring segments by thin concentrically arranged linear cuts, wherein the at least two linear cuts per spring segment are each interrupted at least once so as to form material bridges at mutually offset positions, with each material bridge connecting two adjacent spring segments to each other.

10. Weighing module according to claim 1, wherein the at least one stationary parallel leg has a closed frame structure and/or is provided with at least one of a stiffening bead, a stiffening rib, and a rolled or folded border contour area.

11. Weighing module according to claim 1, wherein the upper parallel-guiding member and the lower parallel-guiding member are arranged between the weighing cell and the load receiver and connected to the force-transmitting rod by the movable parallel leg.

12. Weighing module according to claim 1, wherein the upper parallel-guiding member is arranged between the weighing cell and the load receiver, connected to the force-transmitting rod by an upper movable parallel leg, and the lower parallel-guiding member is arranged on a side of the weighing cell that faces away from the load receiver and connected by a lower movable parallel leg to the force-transmitting rod which is extended beyond the weighing cell.

13. A device for weighing substantially uniform weighing objects, comprising a plurality of weighing modules according to claim 1, wherein the weighing modules are rigidly connected to each other in one of a predefined spatial and two-dimensional arrangement.

14. Device according to claim 13, wherein weighing cell housings of at least two of the weighing modules are monolithically connected to each other.

15. Device according to claim 13, wherein at least one of the upper parallel-guiding members is connected to one or more plates that form an upper compound of stationary parallel legs for the upper parallel-guiding members, and at least one of the lower parallel-guiding members is connected to one or more plates that form a lower compound of stationary parallel legs for the lower parallel-guiding members.

16. Device according to claim 13, wherein all of the parts of the upper parallel-guiding diaphragms are arranged in monolithic connection with each other in a plate, and all of the parts of the lower parallel-guiding diaphragms are arranged in monolithic connection with each other in a plate, wherein each of the upper parallel-guiding diaphragms as well as each of the lower parallel-guiding diaphragms is formed by material-free spaces traversing the plate in an orthogonal direction to the plane in which the plate extends and/or parallel to the plane in which the plate extends.

17. Device according to claim 13, wherein a first set of the weighing modules are arranged in an upper plane and a second set of the weighing modules are arranged in at least one lower plane, said planes lying above each other, wherein the first set of weighing modules form a row and/or two-dimensional array in the upper plane, and the second set of weighing modules form a row and/or two-dimensional array in the lower plane.

18. Device according to claim 17, wherein the first set of weighing modules of the upper plane are arranged at offset positions relative to the weighing modules of the lower plane.

19. Weighing module according to claim 1, wherein a required displacing force is minimized on the movable parallel leg for reduced dimensions of the weighing module in a direction orthogonal to the load.

* * * * *